United States Patent [19]

Hirata

[11] Patent Number: 5,413,200
[45] Date of Patent: May 9, 1995

[54] POWER ASSIST SYSTEM FOR VEHICLE

[75] Inventor: Chiaki Hirata, Shizuoka, Japan

[73] Assignee: Suzuki Kabushiki Kaisha, Japan

[21] Appl. No.: 72,556

[22] Filed: Jun. 7, 1993

[30] Foreign Application Priority Data

Sep. 30, 1992 [JP] Japan .................. 4-262446

[51] Int. Cl.6 .............................................. F16D 23/12
[52] U.S. Cl. ........................... 192/40; 192/83; 192/84 R; 192/90; 192/101; 74/625; 74/502.2
[58] Field of Search .................... 192/40, 83, 84 R, 90, 192/99 S, 101; 74/500.5, 501.6, 502.2, 625

[56] References Cited

U.S. PATENT DOCUMENTS

| 4,766,985 | 8/1988 | Brusasco | 192/90 X |
| 4,938,304 | 7/1990 | Yamaguchi et al. | 74/500.5 X |
| 5,109,968 | 5/1992 | Pollitt et al. | 192/83 |
| 5,119,913 | 6/1992 | Focqueur et al. | 192/83 |
| 5,201,236 | 4/1993 | Nagano | 74/502.2 X |

FOREIGN PATENT DOCUMENTS 58-152338 10/1983 Japan .................. 192/99 S

Primary Examiner—Richard M. Lorence
Attorney, Agent, or Firm—Adams & Wilks

[57] ABSTRACT

A power assist system for imparting an driving force to an operation cable operating a vehicle clutch mechanism is connected to the operation cable to define driving and driven portions of the operating cable. The power assist system comprises an outer casing, a motor having a drive shaft extending into the outer casing, a rotor stably mounted to the drive shaft, and a reel member mounted to the rotor for winding the drive and driven portions of the operation cable. The driving portion of the operation cable is connected to a clutch operation member of the vehicle. An ON-OFF switch is connected to the clutch operation member to control starting and stopping of the driving of the motor. When an operation force is applied to the drive portion of the operation cable through the clutch operation member, the ON-OFF switch activates the motor to cause the rotor to frictionally engage the reel member to impart a driving force to the operation cable to perform a clutching operation.

30 Claims, 9 Drawing Sheets

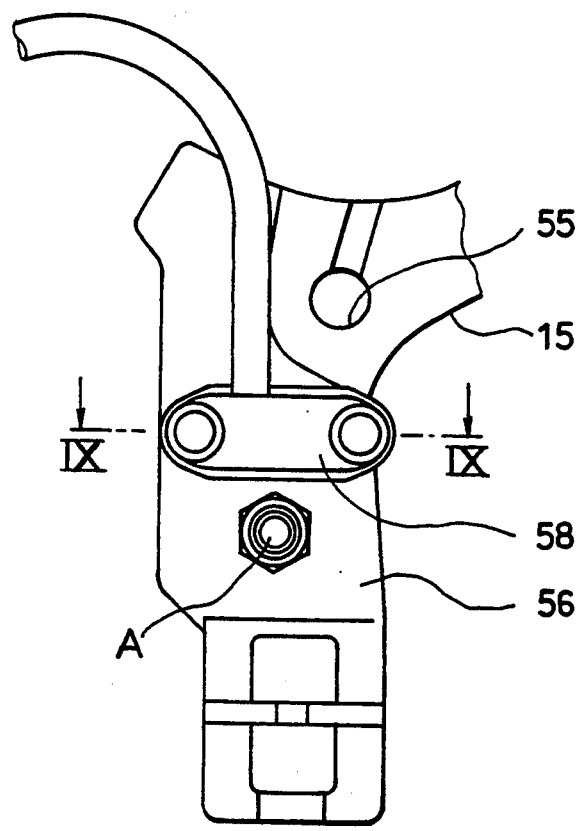
F I G. 8
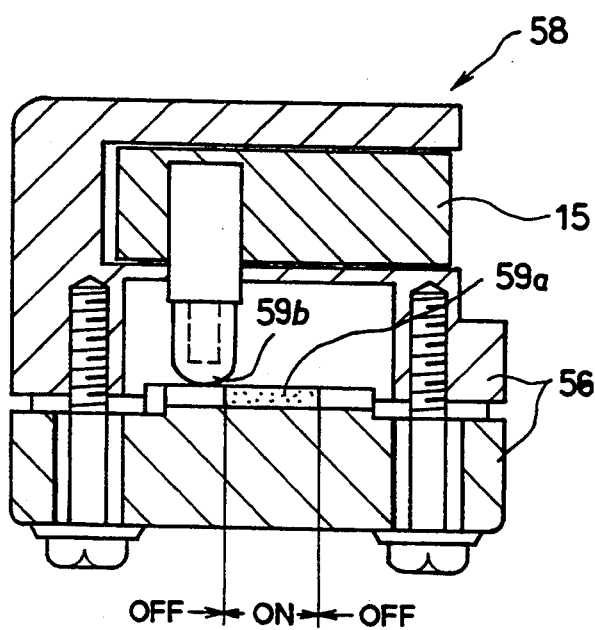
F I G. 9

POWER ASSIST SYSTEM FOR VEHICLE

BACKGROUND OF THE INVENTION

The present invention relates to a power assist system for operating a vehicle clutch mechanism through an operation cable, and is particularly concerned with a power assist system for a vehicle clutch mechanism capable of relieving the operating force of a clutch lever in a motorcycle or clutch pedal in an automobile.

A motorcycle and an automobile are each provided with a clutch mechanism for intermitting a driving force of an engine on a driving system which includes a transmission mechanism, at the time of starting and speed changing operations. The clutch mechanism is subjected to a clutching operation by having a clutch operating force transferred through an operation cable by manual operation of a clutch lever or footing operation of a clutch pedal. In such a case, a leverage is applied to the clutch lever or the clutch pedal and an operating force is moderated by increasing the leverage.

Moreover, the motorcycle and the automobile have a hydraulic power clutch for effecting a moderated intermittent operation of the clutch mechanism. With the hydraulic power clutch, an intermittent operation of the clutch mechanism is carried out by utilizing a negative pressure, such as suction or the like, of an oil pump or an oil pressure generated on the oil pump so that the operating force of the clutch lever or the clutch pedal is moderated.

Conventional hydraulic power clutches are not applicable to a clutch mechanism employing an operation cable to which a clutch operating force is transferred through the operation cable. Moreover, to provide the hydraulic power clutch as mentioned, a multiplicity of associated parts must be refabricated and much time and labor are hence required, which may lead to an increase in cost.

Further, in the case of a clutch mechanism employing an operation cable, the operating force of the clutch lever or the clutch pedal is moderated by increasing the leverage. However, the clutch operating force cannot be decreased sharply. Particularly, in a motorcycle, a speed change operation must be performed often when travelling on a mountain path with many byways or jamming, and hence, the clutch lever must be manipulated in each case. However, when the clutch lever is manipulated frequently, the clutch operating force cannot be moderated sufficiently only by the leverage. Therefore, operating conditions are made worse and the manual operation unduly burdened, thus resulting in an uncomfortable driving condition.

SUMMARY OF THE INVENTION

An object of the present invention is to substantially eliminate defects or drawbacks encountered in the prior art described above and to provide a power assist system for a vehicle clutch mechanism capable of realizing an improvement in the operating efficiency of a clutch lever or a clutch pedal of the vehicle and resulting in a clutch mechanism in which the force required to perform a clutch operation by an operator is decreased.

Another object of the present invention is to provide a power assist system for a vehicle clutch mechanism functioning to add a motor driving force to an operation cable by a clutch operation assisting device to moderate an operating force of a clutch lever or a clutch pedal and also to secure a sharp clutching operation.

A further object of the present invention is to provide a power assist system for a vehicle capable of providing a power clutch mechanism to a conventional model of a motorcycle or automobile in an easy and simple manner.

A still further object of the present invention is to provide a power assist system for a vehicle capable of ensuring a steady clutching operation even during a faulty motor.

These and other objects can be achieved according to the present invention by providing a power assist system for a vehicle clutch mechanism for imparting a driving force of the drive means to an operation cable operating a clutch mechanism of the vehicle, the power assist system being arranged in association with the operation cable and comprising:

an outer casing;
a rotating body disposed inside the casing;
a drive means having a drive shaft to which the rotating body is mounted to be rotatable; and
a winding means around which the operation cable is wound up, the winding means being disposed inside the casing and capable of being in slidable contact with the rotating body,
wherein when an operating force is applied to the operation cable, the rotating body and the winding means are frictionally engaged with each other to transfer a driving force of the drive means to the operation cable.

In a preferred embodiment, the winding means comprises a reel member which is splittable into a plurality of reel pieces, one of which is provided with a cable guide for the operation cable. The reel member is composed of four reel pieces having substantially the same arcuate configuration and disposed in a circumferential direction of the rotating body. The cable guide is composed of engaging holes formed to the reel piece, one of the holes being adapted for a drive portion of operation cable and another one of tile holes being adapted for a driven portion of the operation cable.

The rotating body is composed of a rotor which is mounted to the drive shaft of the drive means through a hub. The rotor is mounted to the drive shaft for relative rotation by a predetermined stroke of the operation cable.

The power assist system further comprises a speed reduction mechanism for transferring an output power of the drive means to the drive shaft.

The operation cable is operatively connected to a clutch priming operation member to which an ON-OFF switch means is operatively connected. The ON-OFF switch means is adapted to control starting and stopping of the driving of the drive means in a manner such that, during an operation stroke of the clutch priming operation member, the ON-OFF switch means is set to ON in an intermediate period of the operation cable and is set to OFF at a maximum operation stroke thereof.

In the case of a motorcycle, the clutch priming operation member is a clutch lever of the motorcycle to which the operation cable is connected and the ON-OFF switch means is connected to the clutch lever.

In the case of an automobile, the clutch priming operation member is a clutch pedal to which the operation cable is connected and the ON-OFF switch means is operatively connected to the clutch pedal.

According to the power assist system of the present invention of the character described above, the clutch operation assisting device is provided halfway along the operation cable for operating the clutch mechanism. A motor driving force is added to the operation cable by the clutch operation assisting device, thereby relieving the operating force of the operation cable necessary for the operation of the clutch mechanism. The operating efficiency of the clutch lever or the clutch pedal is accordingly enhanced, thus ensuring comfortable driving conditions to the operator. Additionally, the power assist system is capable of selectively adding a motor driving force to the operation cable by means of the clutch operation assisting device, thus realizing an appreciable large clutch working rate and a sharp clutching operation.

Further, a power assist system for a conventional model vehicle clutch may be constructed by providing the clutch operation assisting device halfway along the operation cable. Accordingly, the associated parts of the conventional model vehicle can be used without moderfication and the power assist system can be installed to the conventional model vehicle in an easy and simple manner.

Still further, even in the unlikely event that a motor of the clutch operation assisting device runs becomes faulty, the operating force of the clutch lever or the clutch pedal is securely transferred to the clutch mechanism through the operation cable and reel, whereby the clutching operation will not be jeopardized by the faulty motor.

The further nature and features of the present invention will be made more clear hereunder through descriptions with reference to the accompanying drawings.

BRIEF DESCRIPTION OF THE DRAWINGS

In the accompanying drawings:

FIG. 8 is a view showing, from a lower side, a lever holder for mounting the clutch lever of FIG. 7;

FIG. 9 is a sectional view taken along the line IX—IX of FIG. 8 showing a structure of an ON-OFF switch mounted on the lever holder of FIG. 8.

DESCRIPTION OF THE PREFERRED EMBODIMENT

One embodiment of the power assist system for a vehicle clutch mechanism relating to the present invention will be described hereunder with reference to the accompanying drawings.

Figure 1:
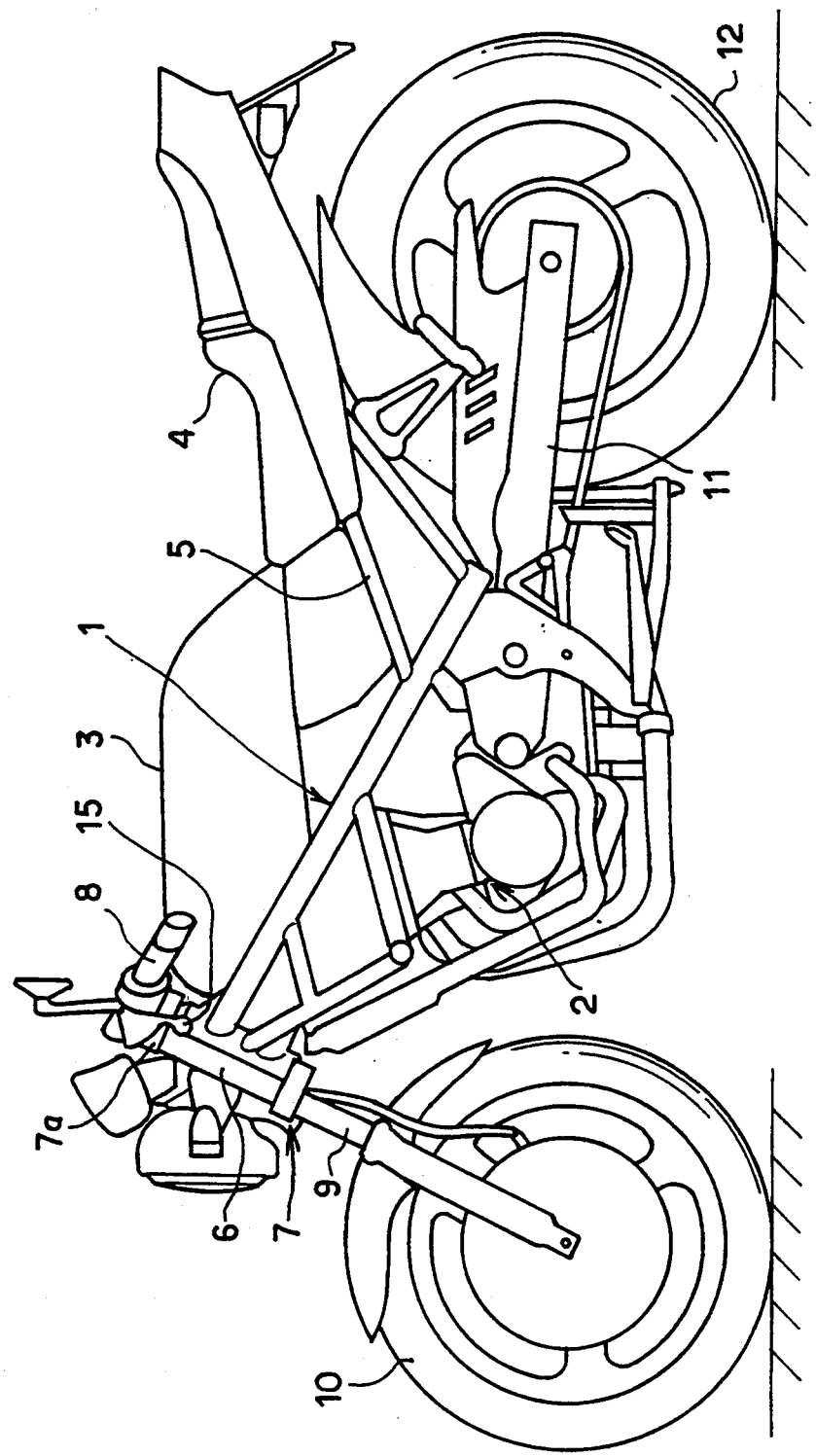
FIG. 1 is a side view showing a motorcycle to which the present invention is applicable.
Figure 2:
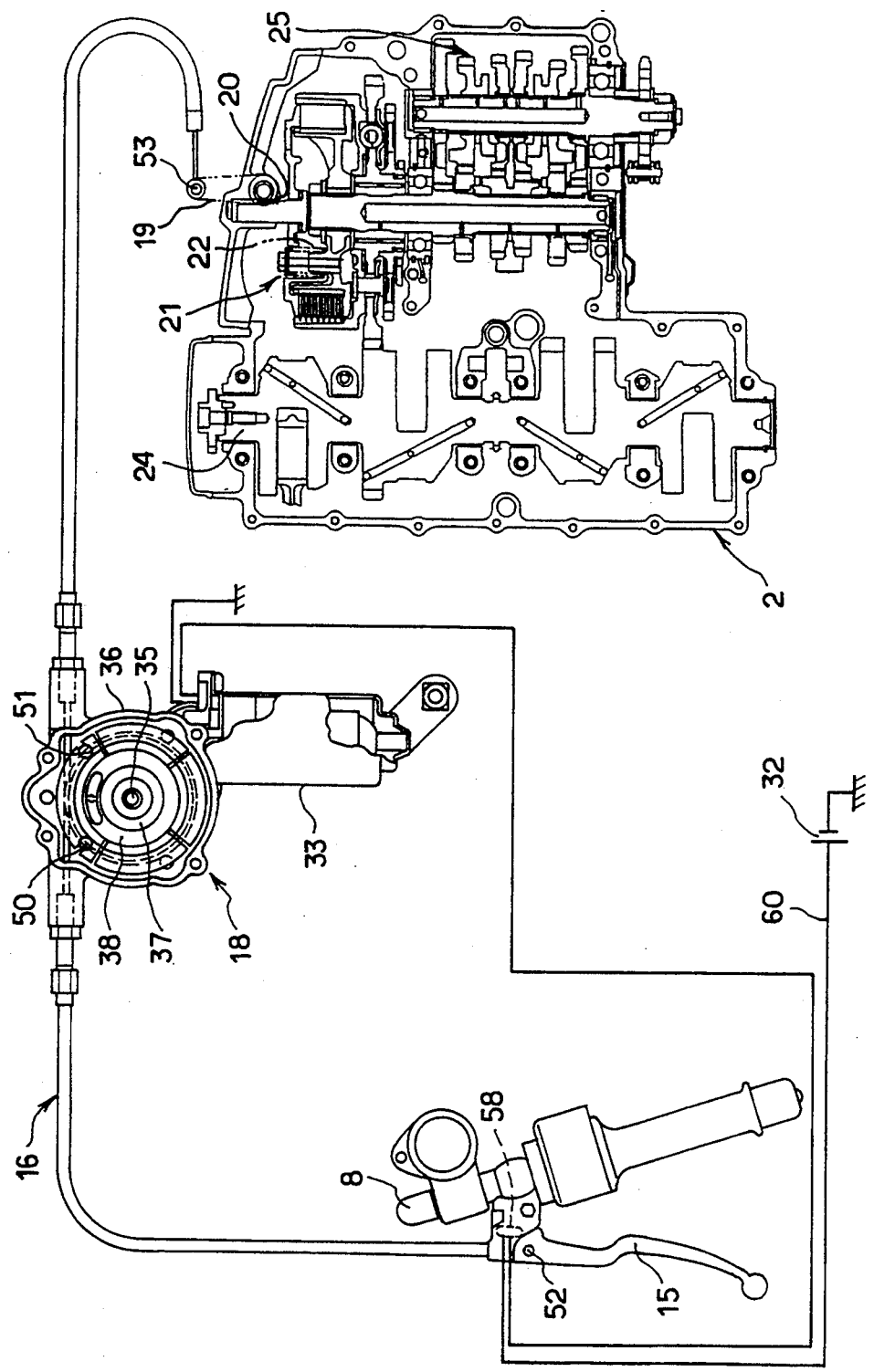
FIG. 2 is view, partially in section, representing one embodiment of a power assist system for a vehicle relating to the present invention.

FIG. 1 is a general side view showing a motorcycle to which the present invention is applicable and FIG. 2 is an illustration in development showing a power assist system for a vehicle clutch mechanism.

Referring to FIGS. 1 and 2, the motorcycle has an engine 2 mounted at a central lower portion of a body frame 1 and a fuel tank 3 provided above the engine 2. A seat 4 is positioned rearward of the fuel tank 3 on a seat rail 5 of the body frame 1.

At a front end of the motorcycle, steering mechanism 7 is mounted rotatably on a head pipe 6 of the body frame 1 and a handle 8 is mounted on an upper bracket 7a of the steering mechanism 7. A front wheel 10 is provided on a lower end of a front fork 9 extending downward of the steering mechanism 7.

At a rear end of the motorcycle, a swing arm 11 is supported swingably in the form of cantilever at the central lower portion of the body frame 1 and a rear wheel 12 is mounted on a rear end of the swing arm 11.

A clutch lever 15 functioning as a priming, i.e. operation starting, clutch operating member and a brake lever, not shown, are mounted to bilateral handle parts of the handle 8 mounted on the upper bracket 7a of the steering mechanism 7. An operation cable 16 extends, at one end as shown in FIG. 2, from the clutch lever 15 as a drive unit or clutch cable, and a clutch operation assisting device 18 is disposed halfway along the operation cable 16. The other end of the operation cable 16 is coupled to a clutch release lever 19.

The clutch release lever 19 is connected to a clutch mechanism 21 through a mechanical operating force transfer mechanism 20, such as pinion-rack mechanism or the like, subjecting a clutch mechanism 21 to the clutching operation against the force of a spring 22. A rotational driving force transferred from a crankshaft 24 of the engine 2 is intermitted to the driving system including a transmission mechanism 25 by a clutching operation of the clutch mechanism 21, which functions to transfer the rotational driving force from the engine 2 to the transmission mechanism 25 on the basis of the force of the spring 22.

Figure 3:
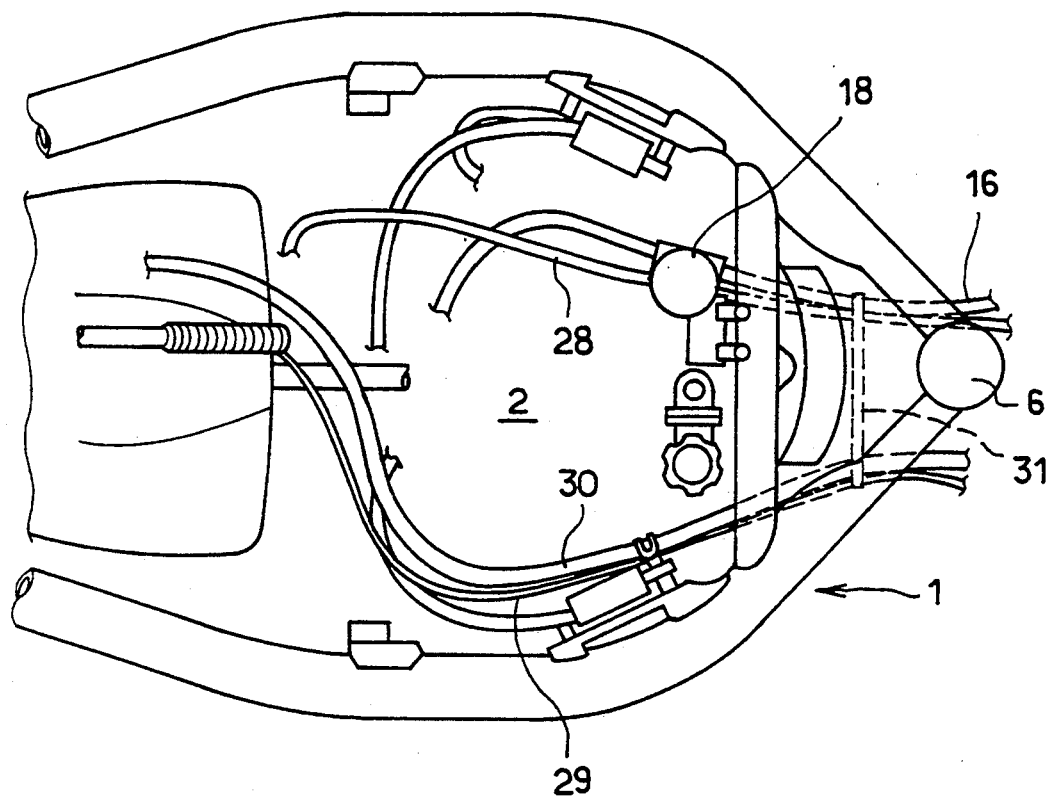
FIG. 3 is a plan view showing an arrangement of an operation cable, in an enlarged scale, of the power assist system shown in FIG. 2.

The operation cable 16 from the clutch lever 15 is drawn around along the body frame 1 through a cable guide 31, as shown in FIG. 3, along with a starter cable 28, a throttle cable 29 and a wire harness 30 and is connected to the clutch release lever 19.

Figure 4:
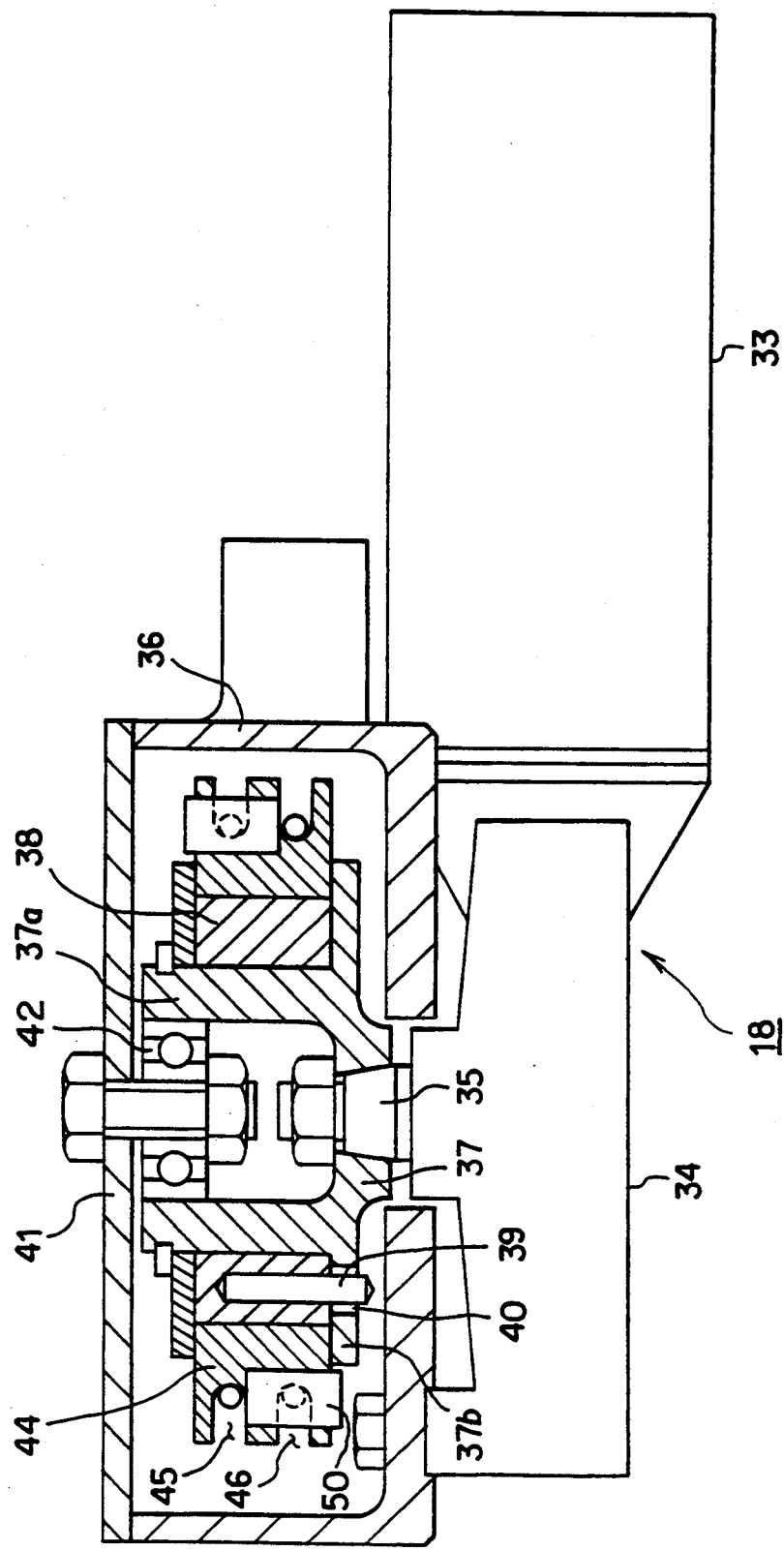
FIG. 4 is a sectional view of a clutch operation assisting device incorporated in the power assist system of FIG. 2.

As shown in FIG. 2, the clutch operation assisting device 18 disposed halfway along the operation cable 16 is provided with a motor 33 which is driven by a battery 32. An output power of the motor 33 is transferred to an outer shaft 35, as shown in FIG. 4, through a speed reduction mechanism 34. A hub 37 enclosed within an outer body casing 36 is mounted on the output shaft 35 to rotate integrally therewith through a tapered or spline coupling. The hub 37 is fixed to the motor output shaft 35 to define one portion of the motor output shaft. The speed reduction mechanism 34 is mounted on the motor 33 and fixedly mounted on the body casing 36. In this embodiment, reference numeral 41 denotes a case cover 41 to which a bearing 42 is mounted, and the hub is guided for rotation by the bearing 42.

Figure 5:
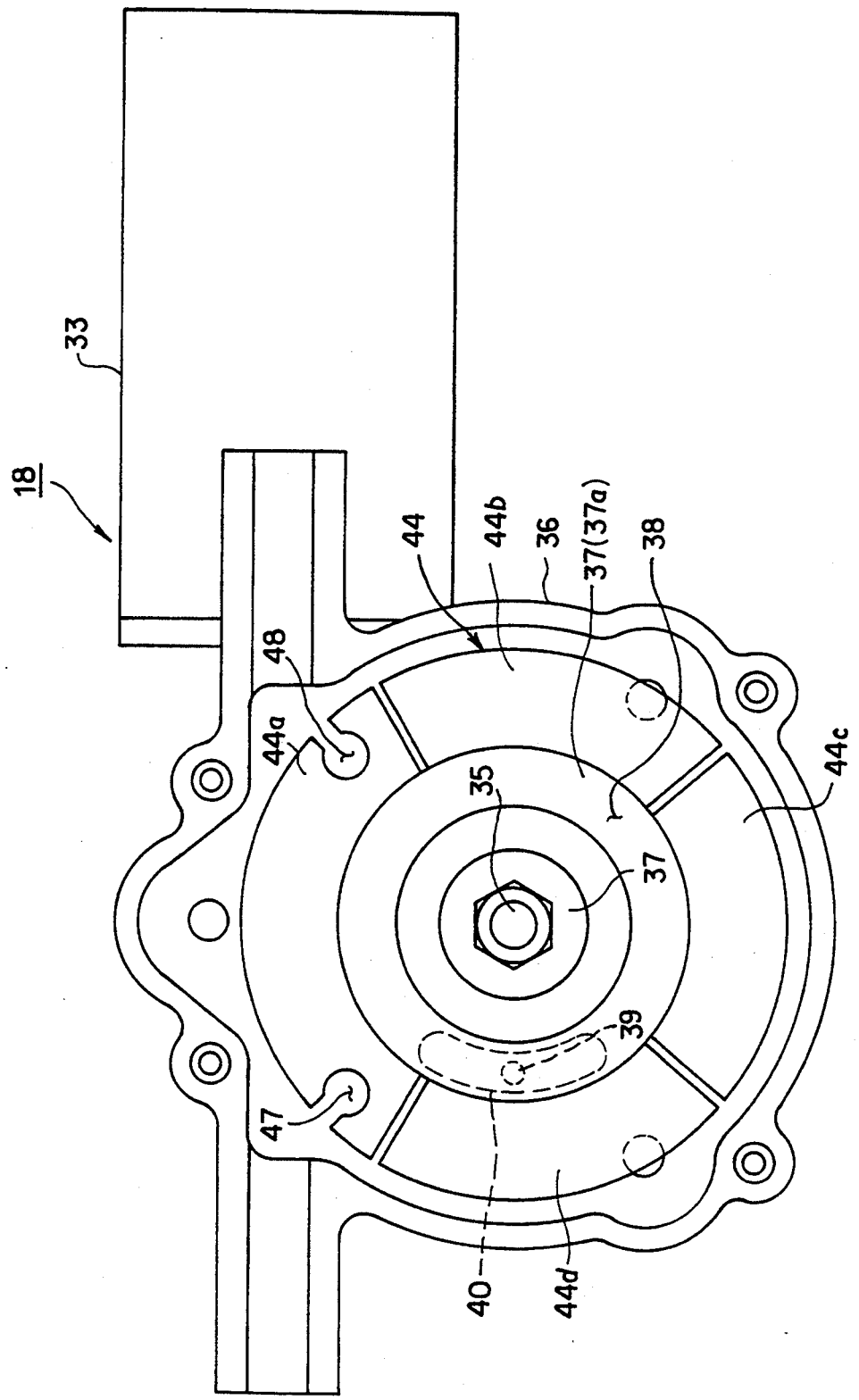
FIG. 5 is a schematic side view of the clutch operation assisting device shown in FIG. 4 with a case cover removed.

A rotor 38 in the form of sleeve constituting a rotating body is fitted in a boss portion 37a of the hub 37. An engaging pin 39 projecting axially is planted to the rotor 38 and the engaging pin 39 is engaged as shown in FIG. 5, with an arcuate elongated hole, i.e. slot, 40 formed in an outside flange 37b of the hub 37. The rotor 38 turns relatively by an amount corresponding to the stroke of the hole 40 with reference to the hub 37.

Winding means comprising a reel member 44 is provided slidably on an outer periphery of the rotor 38. The reel 44 has a split or splittable structure, while forming two cable guide paths 45 and 46 on the outer peripheral side thereof, to comprise an array of a plurality of, or four, for example, arcuate split reel pieces 44a, 44b, 44c and 44d in the circumferential direction thereof. The split reel piece may be arranged to comprise at least two pieces.

Figure 6:
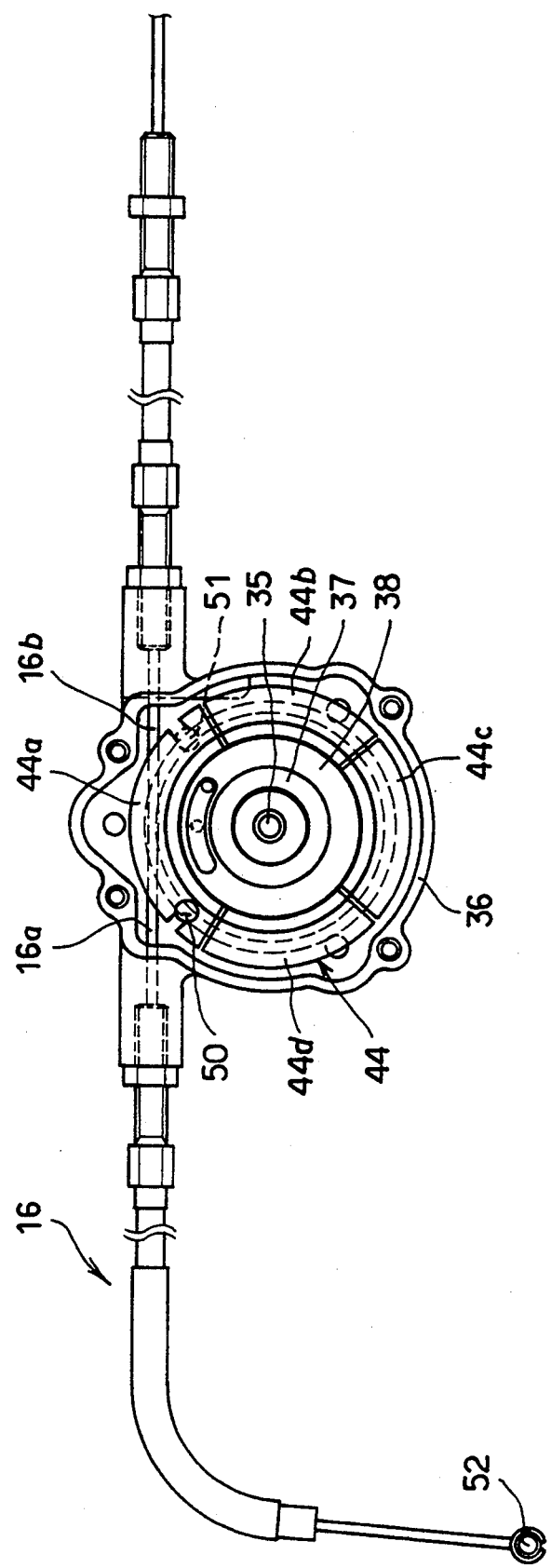
FIG. 6 is a view, partially in section, showing arrangement of the clutch operation assisting device and the operation cable.

Engaging holes 47 and 48 are formed in one split reel piece 44a, for example, to be spaced apart in the circumferential direction so as to cross the cable guide paths 45 and 46 respectively. The engaging hole 47 is engaged, as shown in FIG. 6, with an end piece 50 of a clutch cable 16a defining a drive portion of the operation cable 16. The other engaging hole 48 is engaged with an end piece 51 of a clutch cable 16b defining a driven portion thereof. Each of the clutch cables 16a and 16b on the drive and driven portions, respectively is wound at least halfway around at least around the reel 44. Thus the clutch cables 16a and 16b are wound on the reel 44 substantially one round or more as a whole.

Further, end pieces 52 and 53 are also provided on the other ends of the drive side clutch cable 16a and the driven side clutch cable 16b, respectively, of the operation cable 16. The end piece 52 of the drive portion 16a of the clutch cable is engaged with an engaging hole 55 of the clutch lever 15 (FIG. 17), and the end piece 53 of the driven portion 16b of the clutch cable is engaged with an engaging hole of the clutch release lever 19 (FIG. 2) and then coupled.

Figure 7:
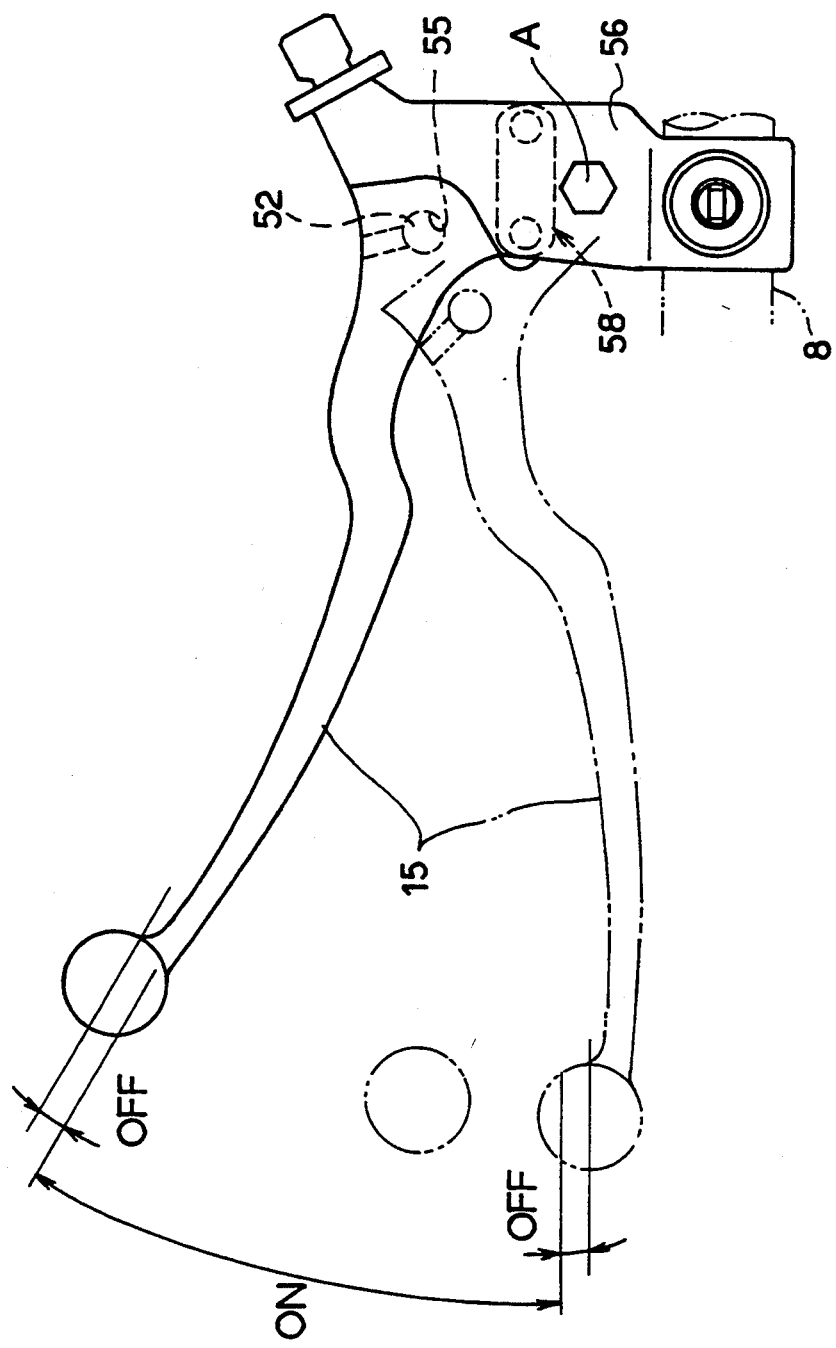
FIG. 7 is an enlarged view showing a clutch lever of a motorcycle.

The clutch lever 15 is rotatably mounted on a lever holder 56, as shown in FIGS. 2 and 7, about a rotational center A thereof. The lever holder 56 is fixed to the handle 8 and activating means comprising an ON-OFF switch 58, such as microswitch or the like, is mounted near the rotation center A of the lever holder 56.

As shown in FIG. 8, and FIG. 9, the ON-OFF switch 58 is provided with a fixed contact 59a on a side of the lever holder 56 and a movable contact 59b on a side of the clutch lever 15 and carries out an ON-OFF action by a pivoting of the clutch lever 15. The ON-OFF switch 58 is set to an OFF state, as shown in FIG. 7, when the clutch lever 15 is not operated. The ON-OFF switch 58 is set to be ON in a second intermediate portion of the operation cable 16 during an operation stroke of the clutch lever 15, and set to be OFF at the point in time of a maximum stroke when the operation cable is in a third position.

According to an ON-OFF action of the ON-OFF switch 58, a power circuit 60 carries out an ON-OFF switching operation as shown in FIG. 2 to thereby start or stop the operation of the motor 33.

When the operation cable 16 is drawn by a manual operation, such as by pivoting, of the clutch lever 15, the reel 44 of the clutch operation assisting device 18 is pushed into frictional engagement with the rotor 38 to a frictional engagement according to a tensile force of the operation cable 16. The reel 44 is then compressed onto the rotor 38 to rotate integrally with the rotor 38. Thus, a driving force of the motor 33 is applied to the operation cable 16 through the reel 44 as a power assist. Accordingly, since a force is required only for pressing the reel 44 against the rotor side to cause a frictional engagement, therebetween the clutch lever 15 need only be pivoted very lightly.

Further, when the clutch operation assisting device 18 is actuated by the operation of the clutch lever 15, the motor driving force is added to the operation cable 16 together with a lever operating force to actuate the clutch release lever 19. Therefore, a clutch operation force large enough to work is obtained and a sharp operation of the clutch mechanism 21 is ensured. In addition, the clutch mechanism 21 operates to effectively perform the clutching operation, thus preventing a rotational output of the engine 2 from being transferred to the transmission mechanism 25.

When the clutch lever 15 is operated by hand to draw the operation cable by a maximum stroke, the ON-OFF switch 58 is turned off and the motor 33 is shut down. Thus, the rotor 38 of the clutch operation assisting device 18 and the reel 44 are prevented from sliding relative to one another more than necessary as they are kept in friction contact.

Still further, when the clutch lever 15 is released, a force of the clutch spring 22 of the clutch mechanism 21 works on the clutch lever 15 through the operation cable 16, thus returning the clutch lever 15 to an original position. In this case, the hub 37 and the rotor 38 of the clutch operation assisting device 18 are retained in a state ready for accepting an operating force of the operation cable 16 to work thereon. Specifically, the engaging pin 39 of the rotor 38 and the engaging hole 40 of the hub 37 mate with each other at a position indicated by a full line of FIG. 6, and an operating force of the clutch lever 15 is ready for transferring toward the clutch mechanism 21.

In order to keep the engaging relationship between the motor output shaft side and the hub 37 and the rotor 38 in relation to the position of the engaging pin as shown in FIG. 6, in the unlikely event that the motor 33 becomes faulty, the operating force transferred to the operation cable 16 is transferred directly to the clutch release lever 19 through the reel 44 by a manual operation of the clutch lever 15, thus realizing the clutching operation of the clutch mechanism 21.

The preferred embodiment of the present invention has been described with reference to the case where the power assist system is applied to a motorcycle. However, it will be understood by those skilled in the art that the power assist system can be applied to a motor tricycle and a four-wheel car likewise.

Figure 10:
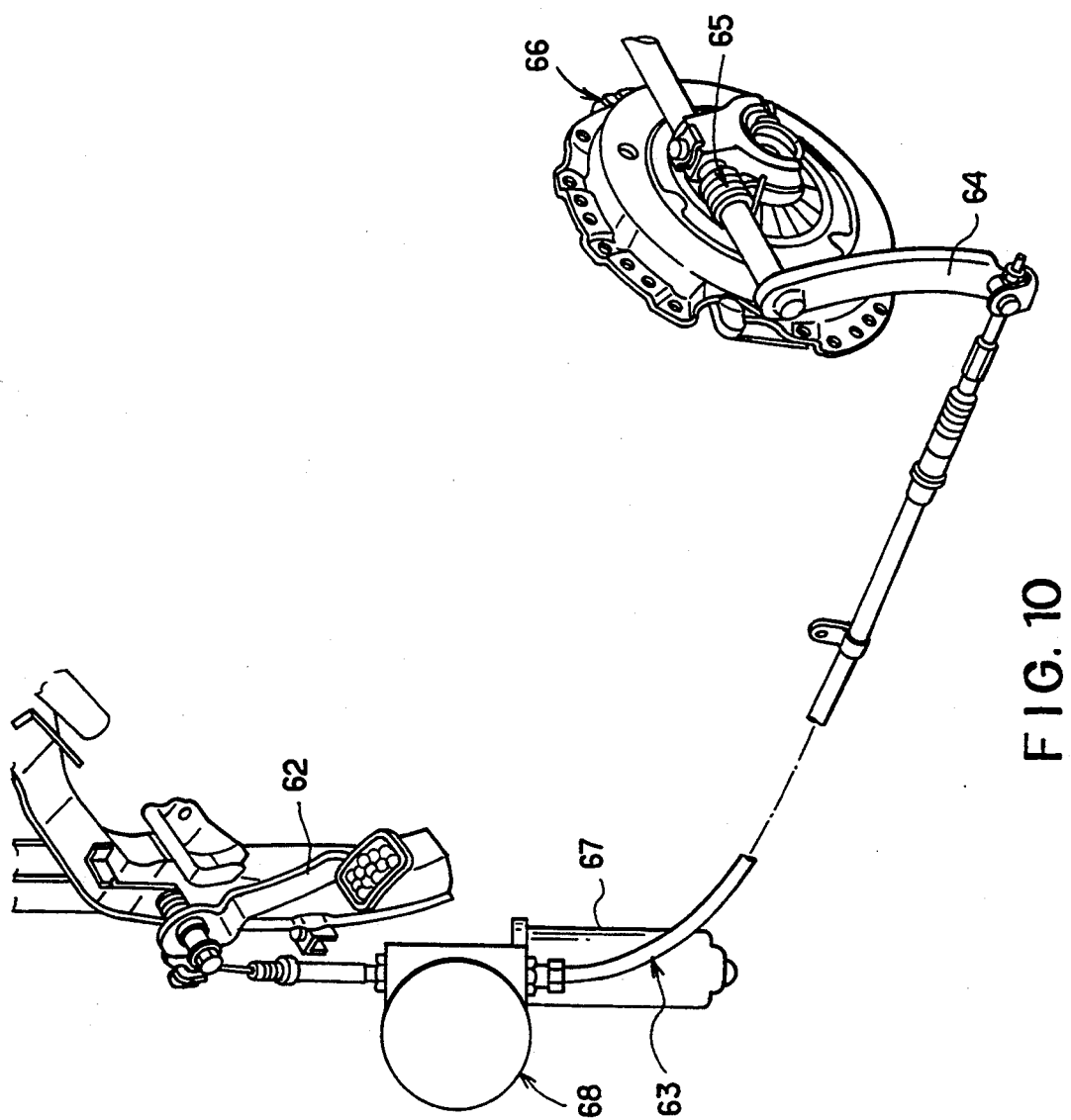
FIG. 10 is a perspective view representing a case where the power assist system of the present invention is applied to an automobile.

FIG. 10 represents a case where the power assist system for a vehicle clutch is applied to an automobile. One end of an operation cable 63 is coupled to a clutch pedal 62 functioning as a priming, i.e. operation starting, clutch operating member of the automobile. The other end of the operation cable 63 is coupled to a clutch release lever 64. The clutch release lever 64 is coupled to a clutch mechanism 66 through a mechanical operating force transfer mechanism 65, such as a worm mechanism of the like, subjecting a clutch mechanism 66 to the clutching operation.

A clutch operation assisting device 68 having a motor 67 is provided halfway along the operation cable 63. The motor 67 of the clutch operation assisting device 68 is also started up and shut down by an ON-OFF switch operatively connected to the clutch pedal and subjected to an ON-OFF switching action by coming into gear with the clutch pedal 62.

The clutch operation assisting device 68 is not different from the clutch operation assisting device 18 for the motorcycle shown in FIGS. 2 to 8, therefore, further description is omitted herein and is not limiting.

In the embodiment described above, while the ON-OFF switch is operatively connected to the clutch lever 15 or clutch pedal 62 of the motorcycle or automobile, respectively, the ON-OFF switch may be operatively connected to the operation cable of the respective vehicle.

It is to be noted that the present invention is not limited to the described embodiment and many other modifications and changes may be made without departing from the scope of the appended claims.

What is claimed is:

1. In a motor vehicle having an engine, a transmission and a clutch mechanism interposed between the engine and transmission, the clutch mechanism having an operation cable having a cable drive portion connected to a clutch operation member and a cable driven portion connected to actuate a clutch release member, a power assist system for imparting an additional driving force to the operation cable, the power assist system comprising: a drive unit connected to both the cable drive and driven portions and operative when activated to impart a driving force to the cable driven portion to actuate the clutch release member to effect a clutching operation; and activating means connected to the clutch operating member for activating the drive unit to effect a clutching operation such that when an operation force is applied to the operation cable through an operation stroke of the clutch operation member, the activating means activates the drive unit to impart a driving force to the cable driven portion to actuate the clutch release member to effect a clutching operation.

2. A power assist system according to claim 1; wherein the drive unit comprises an outer casing, drive means having a drive shaft extending into the outer casing, a rotating body rotatably driven by the drive shaft, and winding means mounted within the outer casing and in slidable contact with the rotating body for winding the cable drive and driven portions of the operation cable when the drive unit is activated by the activating means to effect a clutching operation.

3. A power assist system according to claim 2; wherein the winding means comprises a reel member having a plurality of reel pieces.

4. A power assist system according to claim 3; wherein one of the reel pieces is provided with a cable guide for the operation cable.

5. A power assist system according to claim 4; wherein the reel member comprises four reel pieces having substantially the same arcuate configuration and disposed circumferentially about the rotating body.

6. A power assist system according to claim 4; wherein the cable guide comprises a pair of engaging holes on the one reel piece, one of the engaging holes being adapted for engaging the cable drive portion of the operation cable and the other of the engaging holes being adapted for engaging the cable driven portion of the operation cable.

7. A power assist system according to claim 2; wherein the rotating body comprises a rotor mounted to the drive shaft of the drive means through a hub.

8. A power assist system according to claim 7; wherein the rotor is mounted to the drive shaft for relative rotation thereof by a predetermined operation stroke of the clutch operation member.

9. A power assist system according to claim 2; further comprising a speed reduction mechanism for transferring output power of the drive means to the drive shaft.

10. A power assist system according to claim 2; wherein during application of an operation stroke of the clutch operation member, the operation cable is selectively moved from a first position, through a second intermediate position in which the activating means activates the drive unit, to a third position in which a maximum operation stroke is applied to the clutch operation member.

11. A power assist system according to claim 10; wherein the activating means comprises an ON-OFF switch to control starting and stopping of the drive unit, the ON-OFF switch being set to an OFF state when the operation cable is in the first and third positions, and the ON-OFF switch being set to an ON state when the operation cable is in the second intermediate position.

12. A power assist system according to claim 1; wherein the motor vehicle is a motorcycle and the clutch operation member is a clutch lever of the motorcycle to which the cable drive portion of the operation cable and the activating means are connected.

13. A power assist system according to claim 1; wherein the motor vehicle is an automobile and the clutch operation member is a clutch pedal to which the cable drive portion of the operation cable and the activating means are connected.

14. A power assist system for imparting an additional driving force to an operation cable in a vehicle clutch mechanism having a clutch operation member connected to a cable driving portion of the operation cable and a clutch release member connected to a cable driven portion of the operation cable, the power assist system being connected to both the cable driving and driven portions of the operation cable during use of the power assist system and comprising: an outer casing; drive means having a drive shaft extending into the outer casing for applying a turning driving force to the drive shaft; a rotating body mounted to be turned by the drive shaft; and winding means mounted within the outer casing and frictionally engageable with the rotating body for winding the cable drive and driven portions of the operation cable such that when an operation force is applied to the operation cable through an operation stroke of the clutch operation member, the rotating body and the winding means are frictionally engaged to impart the driving force of the drive means to the cable driven portion of an operation cable.

15. A power assist system according to claim 14; wherein the winding means comprises a reel member having a plurality of compressible reel pieces which are compressible into frictional engagement with the rotating body.

16. A power assist system according to claim 15; wherein one of the reel pieces is provided with a cable guide for an operation cable.

17. A power assist system according to claim 16; wherein the reel member comprises four reel pieces having substantially the same arcuate configuration and disposed circumferentially about the rotating body.

18. A power assist system according to claim 16; wherein the cable guide comprises a pair of engaging holes on the one reel piece, one of the engaging holes being adapted for engaging a cable drive portion of an operation cable and the other of the engaging holes being adapted for engaging a cable driven portion of an operation cable.

19. A power assist system according to claim 14; wherein the rotating body comprises a rotor mounted to the drive shaft of the drive means through a hub.

20. A power assist system according to claim 19; wherein the rotor is mounted to the drive shaft for relative rotation thereof by a predetermined operation stroke of a clutch operation member.

21. A power assist system according to claim 14; further comprising a speed reduction mechanism for transferring output power of the drive means to the drive shaft.

22. A power assist system according to claim 14; wherein during application of an operation stroke of the clutch operation member, the operation cable is selectively moved from a first position, through a second intermediate position in which a driving force is imparted to an operating cable, to a third position in which a maximum operation stroke is applied to the clutch operation member.

23. A power assist system according to claim 22; further comprising an ON-OFF switch to control starting and stopping of the drive means, the ON-OFF switch being set to an OFF state when the operation cable is in the first and third positions, and the ON-OFF switch being set to an ON state when the operation cable is in the second intermediate position.

24. A power assist system for a vehicle having a clutch mechanism operated by an operation cable, the power assist system comprising: an outer casing; a rotationally driven rotating body disposed inside the casing; drive means for rotationally driving the rotating body; and reel means disposed inside the casing and around which the operation cable is wound, the reel means being in slidable contact with the rotating body when an operation force is not applied to the operation cable, and when an operation force is applied to the operation cable, the reel means being compressed onto the rotating body in frictional engagement therewith to impart a driving force of the drive means to the operation cable as a power assist, the reel means comprising a reel member comprised of a plurality of reel pieces which are compressible into frictional engagement with the rotating body one of the reel pieces having a cable guide for the operation cable.

25. A power assist system according to claim 24; wherein the reel member is composed of four reel pieces having substantially the same arcuate configuration and disposed in a circumferential direction of the rotating body.

26. A power assist system according to claim 24; wherein the cable guide comprises engaging holes formed in said one reel piece, one of the engaging holes being adapted to receive a drive side operation cable and another one of the engaging holes being adapted to receive a driven side operation cable.

27. A power assist system according to claim 24; wherein the rotating body comprises a rotor mounted to a drive shaft of the drive means through a hub.

28. A power assist system according to claim 27; wherein the rotor is mounted to the drive shaft to be rotatable relative thereto by a predetermined stroke of the operation cable.

29. A power assist system according to claim 24; further comprising a speed reduction mechanism for transferring an output power of the drive means to the drive shaft.

30. A power assist system according to claim 24; wherein the operation cable is connected to a clutch operation member to which an ON-OFF switch means is connected, the ON-OFF switch means being operative to control starting and stopping of the driving of the drive means such that during an operation stroke of the clutch operation member, the ON-OFF switch means is switched ON in a transition range between the engaged and disengaged position of the clutch operation member, and the ON-OFF switch means is switched OFF at a maximum operation stroke of the clutch operation member.

* * * * *